No. 872,607. PATENTED DEC. 3, 1907.
J. H. B. BRYAN.
COOLING DEVICE FOR FRICTION CLUTCHES.
APPLICATION FILED APR. 26, 1907.

2 SHEETS—SHEET 1.

Witnesses:
Richard Sommer
Gustav W. Hora

John H. B. Bryan Inventor
by Geyer & Popp Attorneys

No. 872,607. PATENTED DEC. 3, 1907.
J. H. B. BRYAN.
COOLING DEVICE FOR FRICTION CLUTCHES.
APPLICATION FILED APR. 26, 1907.
2 SHEETS—SHEET 2.
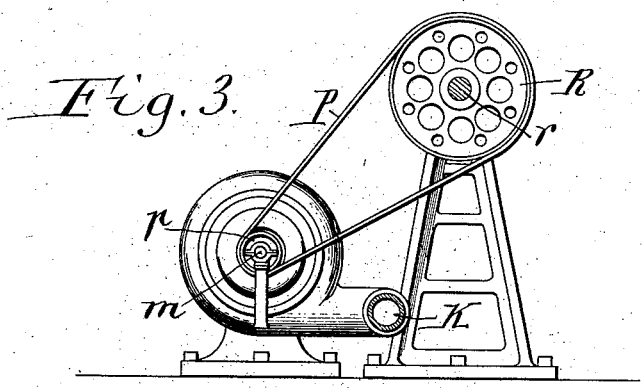
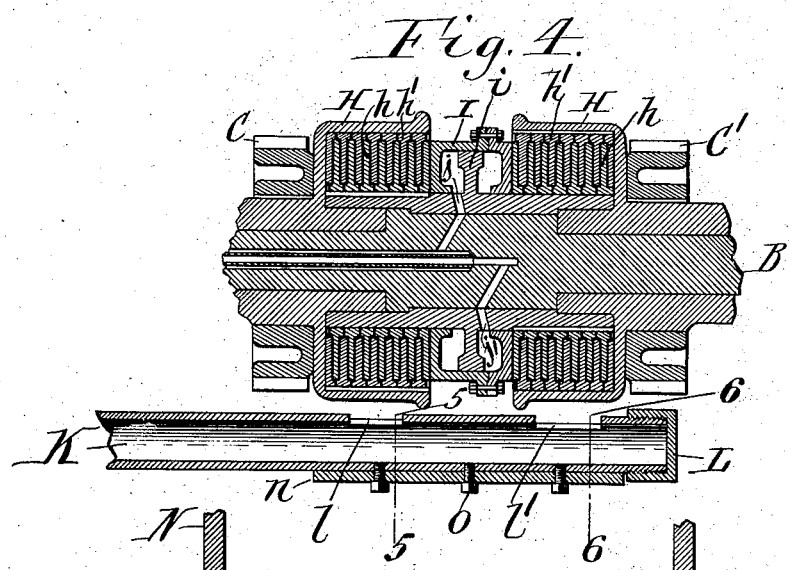
Witnesses:
Richard Sommer
Gustav W. Horn
Inventor
John H. B. Bryan
by Geyer & Popp
Attorneys

UNITED STATES PATENT OFFICE.

JOHN H. B. BRYAN, OF BUFFALO, NEW YORK, ASSIGNOR TO NILES-BEMENT-POND COMPANY, OF JERSEY CITY, NEW JERSEY, A CORPORATION OF NEW JERSEY.

COOLING DEVICE FOR FRICTION-CLUTCHES.

No. 872,607.  Specification of Letters Patent.  Patented Dec. 3, 1907.

Application filed April 26, 1907. Serial No. 370,370.

*To all whom it may concern:*

Be it known that I, JOHN H. B. BRYAN, a citizen of the United States, residing at Buffalo, in the county of Erie and State of New York, have invented a new and useful Improvement in Cooling Devices for Friction-Clutches, of which the following is a specification.

This invention relates to a cooling device which is more particularly designed for the pneumatic friction clutches which form part of the operating mechanism of planer platens but which may also be used for other purposes.

In the absence of any provision to prevent it the friction clutches of planers become unduly heated when the platen is reciprocated with a short stroke inasmuch as a slight slippage occurs every time a clutch is coupled and uncoupled and the intervals between coupling and uncoupling is so short that the parts do not have time to cool off.

The object of this invention is to provide a cooling device of simple and efficient construction for clutches of this character whereby the same are prevented from becoming unduly heated, thus avoiding injury to the clutches and maintaining the same in good working condition regardless of whether the planer is making long or short cuts.

Figure 1:
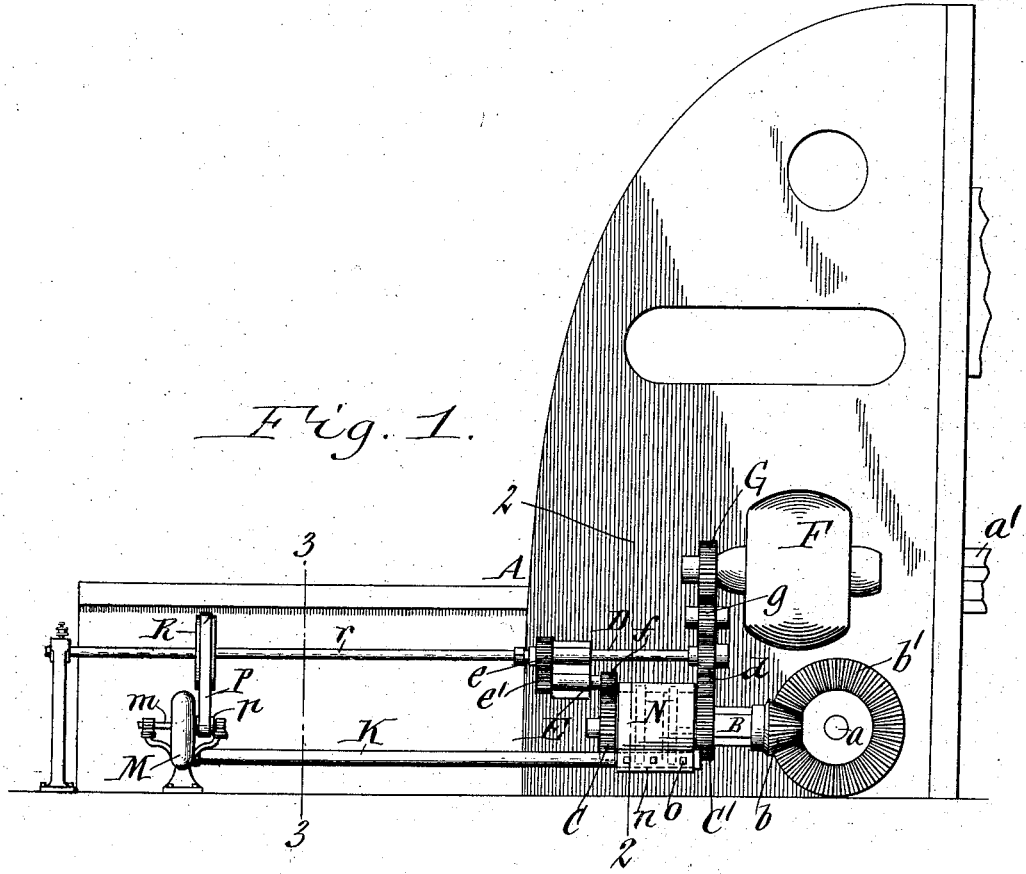
Figure 2:
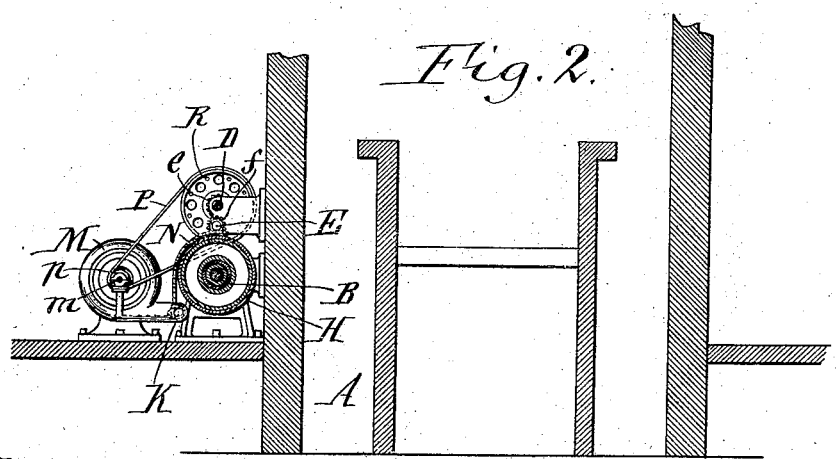

In the accompanying drawings consisting of 2 sheets: Figure 1 is a side elevation of a planer having its driving clutches provided with my cooling device. Fig. 2 is a cross section in line 2—2, Fig. 1. Fig. 3 is a cross section, on an enlarged scale, in line 3—3, Fig. 1. Fig. 4 is a fragmentary longitudinal section, on an enlarged scale, of the clutch and adjacent parts of the cooling device. Figs. 5 and 6 are vertical cross sections, on an enlarged scale, in the correspondingly numbered lines in Fig. 4.

Similar letters of reference indicate corresponding parts throughout the several views.

A represents the main frame of the planer which may be of any suitable construction and $a$ the transverse driven shaft with which the reciprocating platen $a^1$ is operatively connected in any suitable or well known manner.

B represents the clutch shaft which is connected at one end with the planer shaft $a$ by intermeshing bevel gear wheels $b$, $b^1$.

At opposite ends of the clutch shaft are arranged two clutch gear wheels C, $C^1$ which are rotated in opposite directions from a main shaft D by means of a gear wheel $d$ at one end of the main shaft and meshing with the clutch gear wheel $C^1$, a counter shaft E connected at one end with the other end of the main shaft by an intermeshing pair of gear wheels $e$, $e^1$, and a gear pinion $f$ arranged on the opposite end of the counter shaft and meshing with the other clutch gear wheel C, as shown in Fig. 1. The main shaft may be driven in any suitable way, for instance, as shown in Fig. 1, by an electric motor F having its shaft provided with a gear wheel G and a gear wheel $g$ meshing on opposite sides with the motor gear wheel $G^1$ and the main shaft gear wheel $d$.

The clutch gear wheels may be connected with the clutch shaft by pneumatic friction clutches each of which consists of a cylindrical drum H secured to the respective clutch gear wheel, and two sets of clutch disks $h$, $h^1$ arranged about the clutch shaft within the drum, the disks of one set being splined to the clutch shaft and alternating with the disks of the other set which are splined to the drum, upon pressing the two sets of clutch disks together axially the frictional contact between the same causes them to be coupled, thereby operatively connecting the respective clutch gear wheel with the clutch shaft. Between the clutch disks of one clutch and the clutch disks of the other clutch is arranged an axially movable cylinder I which receives an axially stationary piston $i$ secured to the clutch shaft. Upon admitting air through a passage $j$ in the clutch shaft into one end of the cylinder I the latter will press together the disks of one clutch while upon admitting air through a passage $j^1$ in the clutch shaft into the other end of the cylinder I the disks of the other clutch will be pressed together, thereby enabling the clutch shaft to be turned in either direction depending on which of the two pneumatic friction clutches is operated.

Before the two sets of disk of a clutch grip each other sufficiently firm to cause them to turn together and during the initial uncoupling action of the same a slight slippage under pressure occurs between the two sets of clutch disks. When the planer platen is working with a long stroke sufficient time elapses between the coupling and uncoupling of the clutch to enable the same to radiate the heat which is developed by the frictional contact between the two sets of disks, thus preventing undue heating of the parts. If, however, the planer platen is operated very rapidly as occurs when the work requires only a short stroke of the platen, the clutches are reversed more rapidly and the interval of time between the coupling and uncoupling of a clutch is reduced correspondingly, and in the absence of any provision to prevent it excessive heating of the clutches and injury to the parts would occur at this time because the heat developed during the operation of the clutches would not radiate fast enough.

In order to overcome the difficulty, the radiation of the heat from the clutches is facilitated by my cooling device which is constructed as follows: K represents an air supply or blast pipe which is arranged adjacent to said clutches parallel with their axes and preferably at the lower outer side thereof. This pipe is provided opposite the clutch barrel with air outlet openings or longitudinal slots $l$, $l^1$ and is closed at one end by a cap L while its opposite end is connected with the outlet of the case M of a rotary fan or other air forcing device. The outlet openings are so formed in the blast pipe that the air jets issuing therefrom are of flat or sheet like form and directed upwardly and inwardly against the curved outer surface of the clutch barrels on a tangent relatively thereto. The air upon striking the clutch barrels absorbs the heat which is developed by the coupling and uncoupling of the clutches and causes the same to remain cool and work properly. It also avoids undue wear of the clutches which would result if the same were run while in a heated condition.

In order to cause the air to be supplied uniformly to both clutches the first opening $l$ which is nearer the fan is of smaller area than the second opening $l^1$, whereby the escape of air through the openings $l$ which is reached first is throttled while the escape of air through the second opening $l^1$ which is reached later is permitted to escape more freely, thereby equalizing the distribution of air between the two clutches.

For the purpose of causing the air to remain in contact with the clutch barrels a considerable period of time a retaining hood N is provided. This hood preferably extends upwardly from said pipe above the jet openings $l$, $l^1$ and concentrically around about one third of the periphery of the clutch barrels and is provided at its lower end with a curved flange $n$ which fits the outer side of the blast pipe and is secured thereto by bolts $o$ or otherwise. The air is thus compelled to absorb the maximum amount of heat from the clutches before leaving the same at the upper end of the hood.

The blades of the fan may be rotated from any suitable source but preferably by a belt P passing around a pulley $p$ on the fan-shaft $m$ and around a pulley R which is mounted on a shaft $r$ connected with and forming an extension of the main driving shaft D, as shown in Figs. 1 and 2.

I claim as my invention:

1. The combination of a pair of friction clutches, and an air supply pipe arranged adjacent to said clutches and having one end closed and its other end connected with an air forcing device while its side is provided with an air outlet opening opposite each of said clutches, the opening nearest the air supplying device being of smaller area than the opening farther away from the same, substantially as set forth.

2. The combination of a pair of friction clutches, an air supply pipe arranged adjacent to the clutches and having an outlet opening opposite each clutch, a rotary fan having the outlet of its case connected with said pipe, a driving shaft having an extension, reversing gearing interposed between said shaft and clutches, a pulley arranged on said shaft extension, and a belt passing around said pulley and a pulley on the shaft of said fan, substantially as set forth.

Witness my hand this 11th day of April, 1907.

JOHN H. B. BRYAN.

Witnesses:
CHAS. J. CAMP,
T. J. HASSETT, Jr.